(12) United States Patent
Hart et al.

(10) Patent No.: US 9,491,737 B2
(45) Date of Patent: Nov. 8, 2016

(54) COMMUNICATION SYSTEMS

(75) Inventors: Michael John Beems Hart, London (GB); Yuefeng Zhou, Haywards Heath (GB)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/036,640

(22) Filed: Feb. 28, 2011

(65) Prior Publication Data
US 2011/0165834 A1    Jul. 7, 2011

Related U.S. Application Data

(62) Division of application No. 11/840,644, filed on Aug. 17, 2007.

(30) Foreign Application Priority Data

Aug. 18, 2006  (GB) .................................. 0616474.3

(51) Int. Cl.
*H04B 7/14* (2006.01)
*H04W 72/04* (2009.01)
(Continued)

(52) U.S. Cl.
CPC ............ *H04W 72/04* (2013.01); *H04J 3/0632* (2013.01); *H04B 7/2606* (2013.01); *H04W 16/26* (2013.01); *H04W 84/047* (2013.01); *H04W 84/22* (2013.01)

(58) Field of Classification Search
USPC ....... 370/254, 345, 315, 310, 252, 280, 329; 455/7, 423, 11.1; 375/145, 149
See application file for complete search history.

(56) References Cited

U.S. PATENT DOCUMENTS

| 4,827,474 A | 5/1989 | Le Goffic et al. |
| 5,719,868 A | 2/1998 | Young |

(Continued)

FOREIGN PATENT DOCUMENTS

| EP | 0 151 280 | 12/1984 |
| EP | 1 617 693 | 1/2006 |

(Continued)

OTHER PUBLICATIONS

Communication from the European Patent Office, European Search Report for Application No. EP 07113557.8-1525, Dec. 3, 2007, 7 pages.

(Continued)

*Primary Examiner* — Phuongchau Ba Nguyen
(74) *Attorney, Agent, or Firm* — Baker Botts L.L.P.

(57) ABSTRACT

A transmission method for use in a multi-hop wireless communication system is provided. The system includes a source apparatus, a destination apparatus and one or more intermediate apparatuses. The system has access to at least one predetermined transmission introduction sequence and also having access to a time-frequency format for use in assigning available transmission frequency bandwidth during a discrete transmission interval, said format defining a plurality of transmission windows within such an interval. The method for use in this system includes, when transmitting a message with a preamble in a particular transmission interval, transmitting the preamble in a first transmission window of that transmission interval. The method further includes transmitting the transmission introduction sequence in a second transmission window of that transmission interval other than the first transmission window as control information for use by at least one said intermediate apparatus.

12 Claims, 7 Drawing Sheets

(51) Int. Cl.
*H04J 3/06* (2006.01)
*H04B 7/26* (2006.01)
*H04W 16/26* (2009.01)
*H04W 84/04* (2009.01)
*H04W 84/22* (2009.01)

(56) References Cited

U.S. PATENT DOCUMENTS

| | | | |
|---|---|---|---|
| 5,872,772 A * | 2/1999 | Mizuno et al. | 370/254 |
| 6,370,384 B1 | 4/2002 | Komara | |
| 6,701,129 B1 | 3/2004 | Hashem et al. | |
| 6,950,413 B1 * | 9/2005 | Liou | 370/312 |
| 7,096,274 B1 | 8/2006 | Ci et al. | |
| 7,508,798 B2 | 3/2009 | Tong et al. | |
| 2002/0080816 A1 | 6/2002 | Spinar et al. | |
| 2003/0054771 A1 | 3/2003 | Chappaz | |
| 2004/0005861 A1 | 1/2004 | Tauchi | |
| 2004/0100929 A1 | 5/2004 | Garcia-Luna-Aceves | |
| 2004/0109428 A1 | 6/2004 | Krishnamurthy | |
| 2005/0030887 A1 | 2/2005 | Jacobsen et al. | |
| 2005/0048914 A1 | 3/2005 | Sartori et al. | |
| 2006/0023745 A1 | 2/2006 | Koo et al. | |
| 2006/0029017 A1 | 2/2006 | Mudulodu et al. | |
| 2006/0044643 A1 | 3/2006 | Durecu et al. | 359/330 |
| 2006/0046643 A1 * | 3/2006 | Izumikawa et al. | 455/7 |
| 2006/0062196 A1 * | 3/2006 | Cai et al. | 370/345 |
| 2006/0153112 A1 | 7/2006 | Lim et al. | |
| 2006/0215542 A1 | 9/2006 | Mandyam | |
| 2006/0256741 A1 | 11/2006 | Nozaki | |
| 2006/0264172 A1 | 11/2006 | Izumikawa et al. | |
| 2006/0285505 A1 * | 12/2006 | Cho et al. | 370/254 |
| 2007/0004347 A1 * | 1/2007 | Sondur | 455/101 |
| 2007/0072600 A1 * | 3/2007 | Cho et al. | 455/423 |
| 2007/0201392 A1 * | 8/2007 | Ramachandran | 370/315 |
| 2007/0217353 A1 | 9/2007 | Asa et al. | |
| 2008/0039107 A1 * | 2/2008 | Ma et al. | 455/450 |
| 2008/0043709 A1 | 2/2008 | Zhou et al. | |
| 2008/0043710 A1 | 2/2008 | Zhou et al. | |
| 2008/0043711 A1 | 2/2008 | Hart et al. | |
| 2008/0043712 A1 | 2/2008 | Hart et al. | |
| 2008/0043815 A1 | 2/2008 | Hart et al. | |
| 2008/0043816 A1 | 2/2008 | Hart et al. | |
| 2008/0043817 A1 | 2/2008 | Beems Hart et al. | |
| 2008/0045238 A1 | 2/2008 | Zhou et al. | |
| 2008/0159217 A1 * | 7/2008 | Chang et al. | 370/329 |
| 2008/0167075 A1 * | 7/2008 | Kurtz et al. | 455/561 |
| 2008/0186950 A1 * | 8/2008 | Zhu et al. | 370/350 |
| 2008/0212512 A1 * | 9/2008 | Harpek et al. | 370/315 |

FOREIGN PATENT DOCUMENTS

| | | | |
|---|---|---|---|
| EP | 1 635 593 | 3/2006 | |
| EP | 1 677 443 | 7/2006 | |
| EP | 1 804 430 A1 | 7/2007 | |
| JP | 6268635 | 9/1994 | H04B 1/44 |
| WO | WO 99/44341 | 9/1999 | |
| WO | WO 01/76289 | 10/2001 | |
| WO | WO 03/058984 | 7/2003 | |
| WO | WO 2004/056013 | 7/2004 | |
| WO | WO 2004/107693 | 12/2004 | |
| WO | WO 2005/067173 | 7/2005 | |
| WO | WO 2006/000091 | 1/2006 | H04J 11/00 |
| WO | WO 2006/012554 | 2/2006 | |
| WO | WO 2006/065069 | 6/2006 | |
| WO | WO 2006/098608 | 9/2006 | |
| WO | WO 2006/120161 | 11/2006 | |

OTHER PUBLICATIONS

Communication from the European Patent Office, European Search Report for Application No. EP 07 11 3538, Dec. 27, 2007, 7 pages.
Communication from the European Patent Office, European Search Report for Application No. EP 08 15 8421, Oct. 21, 2008, 1 pages.
Communication from the European Patent Office, European Search Report for Application No. EP 07 11 3481, Oct. 19, 2007, 1 pages.
The Patent Office, Search Report under Section 17, U.K. Application No. GB0616482, date of search Oct. 27, 2006, 1 page.
The Patent Office, Search Report under Section 17, U.K. Application No. GB0616471, date of search Oct. 27, 2006, 1 page.
The Patent Office, Search Report under Section 17, U.K. Application No. GB0616477, date of search Oct. 27, 2006, 1 page.
The Patent Office, Search Report under Section 17, U.K. Application No. GB0616472, date of search Nov. 3, 2006, 1 page.
The Patent Office, Search Report under Section 17, U.K. Application No. 0616479, date of search Oct. 27, 2006, 1 page.
The Patent Office, Search Report under Section 17, U.K. Application No. 0622124, date of search Dec. 7, 2006, 1 page.
The Patent Office, Search Report under Section 17, U.K. Application No. 0622122, date of search Nov. 28, 2006, 1 page.
IEEE Computer Society, "IEEE Standards for Information Technology, 803.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.
Hart et al., "Relay Midamble," IEEE 802.16 Broadband Wireless Access Working Group < http://ieee802.org/16>, pp. 0-3, Nov. 6, 2006.
Hart et al., "Frame Structure for Multihop Relaying Support," IEEE 802.16 Broadband Wireless Access Working Group < http://ieee802.org/16>, IEE C80216j/138, ieee 802.16 meeting #46, pp. 0-9, Nov. 2006.
Hart et al., >, "TDD MR Frame Structure," IEEE 802.16 Broadband Wireless Access Working Group < http://ieee802.org/16>, pp. 1-10, Oct. 20, 2006.
Hart, "Dimensioning and System Level Analysis of an HSDPA Network with Relaying Nodes," 5 pages, 2005.
Chu, "Polyphase Codes with Good Periodic Correlation Properties," IEEE Transactions on Information Theory, Jul. 1972, pp. 531-532.
Frank et al., "Phase Shift Pulse Codes with Good Periodic Correlation Properties," IRE Transactions on Information Theory, pp. 381-382, Oct. 1962.
Milewski, "Periodic Sequences with Optimal Properties for Channel Estimation and Fast Start-Up Equalization," IBM Research and Development Journal, pp. 426-431, Sep. 1983.
Hart, "Optimal Transmit Power Balancing in Multi-Hop Networks," Fujitsu Laboratories of Europe, Ltd., 6 pages, 2005.
Golay, "Multi-Slit Spectrometry," Journal of the Optical Society of America, vol. 39, No. 6, pp. 437-444, Jun. 1949.
Golay, "Complementary Series," IRE Transactions on Information Theory, IT 7, pp. 82-87, Apr. 1961.
Zhou et al., "Communication Systems," Pending U.S. Appl. No. 11/840,492, filed Aug. 17, 2007.
Zhou et al., "Communication Systems," Pending U.S. Appl. No. 11/840,518, filed Aug. 17, 2007.
Hart et al., "Communication Systems," Pending U.S. Appl. No. 11/840,546, filed Aug. 17, 2007.
Hart et al., "Communication Systems," Pending U.S. Appl. No. 11/840,570, filed Aug. 17, 2007.
Zhou et al., "Communication Systems," Pending U.S. Appl. No. 11/840,595, filed Aug. 17, 2007.
Hart et al., "Communication Systems," Pending U.S. Appl. No. 11/840,621, filed Aug. 17, 2007.
Hart et al., "Communication Systems," Pending U.S. Appl. No. 11/840,644, filed Aug. 17, 2007.
Hart et al., "Communication Systems," Pending U.S. Appl. No. 11/840,669, filed Aug. 17, 2007.
Hart et al., "Communication Systems," Pending U.S. Appl. No. 11/840,429, filed Sep. 7, 2007.
Hart et al., "Communication Systems," Pending U.S. Appl. No. 11/840,430, filed Sep. 7, 2007.
Hart et al., "Wireless Communication Systems," Pending U.S. Appl. No. 11/856,139, filed Sep. 17, 2007.
Hart et al., "Wireless Communication Systems," Pending U.S. Appl. No. 11/856,145, filed Sep. 17, 2007.

(56) References Cited

OTHER PUBLICATIONS

Hart et al., "Communication Systems," Pending U.S. Appl. No. 11/856,178, filed Sep. 17, 2007.
Kaneko et al., "Proposed Relay Method with P-MP Structure of IEEE802.16/2004," 2005 IEEE 16th International Symposium on Personal, Indoor and Mobile Radio Communications, pp. 1606-1610, Sep. 11, 2005-Sep. 14, 2005.
Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.
Etri et al, Transmission of IP Packets over Ethernet over IEEE 802.16, draft-riegel-16ng-ip-over-eth-over-80216-01.txt, Oct. 1, 2006, pp. 1-16.
Kim et al., Fair and Efficient Multihop Scheduling Algorithm for IEEE 802.16 BWA Systems, pp. 895-901, Oct. 3-7, 2005.
European Patent Office, European Search Report for Application No. EP 08 15 5435, Aug. 1, 2008, 8 pages.
European Patent Office, European Search Report for Application No. EP 07 11 3483, Sep. 26, 2007, 6 pages.
IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.
Hart et al., "Factors That Affect Performance of a Mobile Multihop Relay System," IEEE 802.16 Presentation Submission Template (Rev.8.3), Sep. 13, 2005, 19 pages.
Relay Task Group of IEEE 802.16, "Part 16: Air Interface for Fixed and Mobile Broadband Wireless Access Systems," Multihop Relay Specification, p. 1-12 and 78-104, Jun. 6, 2007.
Japanese Office Action with English Translation; Application No. 2009-245631; pp. 3, Jan. 4, 2012.
Japanese Office Action with English Translation; Application No. 2007-214177; pp. 5, Jan. 4, 2012.
Japanese Office Action with English Translation; Application No. 2007-214178; pp. 6, Jan. 10, 2012.
Chinese Office Action with English Translation; Application No. 2007-10141993.4; pp. 13, Dec. 31, 2011.
Gang Shen et al., "Recommendations on IEEE 802.16j", IEEE C802.16; pp. 7, May 2006.
Chinese Office Action with English translation; Application No. 201010122264.6; pp. 19, May 24, 2012.
Fang-Ching Ren et al.; "Recommendation on PMP Mode Compatible TDD Frame Structure"; IEEE 802.16 Session # 39; pp. 16, Nov. 11, 2005.
Extended European Search Report; Application No. 07113544.6-1248; pp. 5, Aug. 6, 2012.
Hart et al.; "Relay midamble"; IEEE 802.16 Braodband Wireless Access Working Group; http://ieee802.org/16; pp. 3, Nov. 7, 2006.
Asa et al.; "Relay Strategy of Broadcast Messages in Mobile Multihop Relay"; IEEE 802.16 Presentation Submission Template (Rev. 8.3); Venue: IEEE 802.16 Session #41, New Delhi, India; pp. 14, Jan. 6, 2006.
Chinese Office Action with English translation; Application No. 200710141986.4; pp. 16, Dec. 5, 2012.
Taiwanese Office Action with English translation; Application No. 100131685; pp. 15, Mar. 12, 2014.

\* cited by examiner

RA zone and RA region definition.

[structur]e of transmission resource in an RA zone.

Interaction between the transmitters and the network management entity

RA reception and processing procedure in the receiver

Interaction between a network associating RS and the already operational network

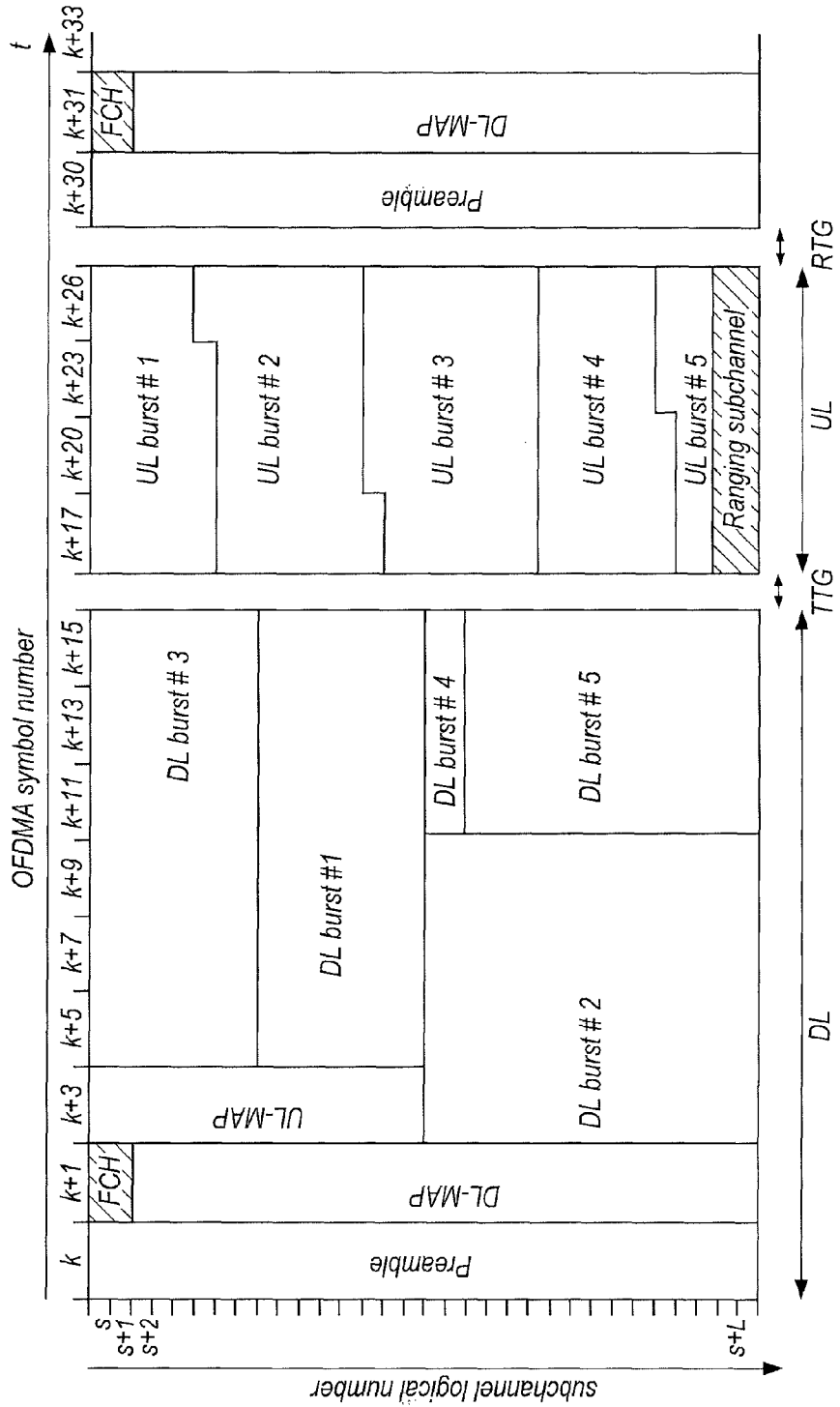
Fig.8  Example TDD frame structure from OFDMA physical layer of the IEEE802.16 standard

COMMUNICATION SYSTEMS

RELATED APPLICATION

The present application is a divisional application of U.S. patent application Ser. No. 11/840,644 filed Aug. 17, 2007, which claims foreign priority benefits under 35 U.S.C. §119 of United Kingdom Application No. GB 0616474.3, filed on Aug. 18, 2006, entitled "Communication Systems".

CROSS-REFERENCE TO RELATED APPLICATIONS

This application relates to the following applications, each of which is incorporated herein by reference:
COMMUNICATION SYSTEMS, application Ser. No. 11/840,492, filed Aug. 17, 2007;
COMMUNICATION SYSTEMS, application Ser. No. 11/840,518, filed Aug. 17, 2007;
COMMUNICATION SYSTEMS, application Ser. No. 11/840,546, filed Aug. 17, 2007;
COMMUNICATION SYSTEMS, application Ser. No. 11/840,570, filed Aug. 17, 2007;
COMMUNICATION SYSTEMS, application Ser. No. 11/840,595, filed Aug. 17, 2007;
COMMUNICATION SYSTEMS, application Ser. No. 11/840,621, filed Aug. 17, 2007;
COMMUNICATION SYSTEMS, United Kingdom Application No. GB 0616478.4, filed on Aug. 18, 2006;
COMMUNICATION SYSTEMS, United Kingdom Application No. GB 0616475.0, filed on Aug. 18, 2006; and
COMMUNICATION SYSTEMS, United Kingdom Application No. GB 0616476.8, filed on Aug. 18, 2006.

TECHNICAL FIELD

This invention relates in general to communication systems, and more particularly to a relay-amble in a communication frame.

OVERVIEW

Currently there exists interest in the use of multihop techniques in packet based radio and other communication systems, where it is purported that such techniques will enable both extension in coverage range and increase in system capacity (throughout).

In a multi-hop communication system, communication signals are sent in a communication direction along a communication path (C) from a source apparatus to a destination apparatus via one or more intermediate apparatuses. FIG. 6 illustrates a single-cell two-hop wireless communication system comprising a base station BS (known in the context of 3 G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIG. 7 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 7 is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 7 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modeled by:

$$L = b + 10n \log d \quad (A)$$

Where d (meters) is the transmitter-receiver separation, b(db) and n are the pathloss parameters and the absolute pathloss is given by $l = 10^{(L/10)}$.

The sum of the absolute path losses experienced over the indirect link SI+ID may be less than the pathloss experienced over the direct link SD. In other words it is possible for:

$$L(SI) + L(ID) < L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE 802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both subcarriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \quad (1)$$

$$0 \leq t \leq T_s$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \in C_a$, $c=(c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE 802.16 standard incorporates both an FDD and TDD mode.

As an example, FIG. 8 illustrates the single hop TDD frame structure used in the OFDMA physical layer mode of the IEEE 802.16 standard (WiMAX). Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP. The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

SUMMARY OF EXAMPLE EMBODIMENTS

In accordance with one embodiment of the present invention, a transmission method for use in a multi-hop wireless communication system is provided. The system includes a source apparatus, a destination apparatus and one or more intermediate apparatuses. The source apparatus is operable to transmit information along a series of links forming a communication path extending from the source apparatus to the destination apparatus via the intermediate apparatus. Each intermediate apparatus is operable to receive information from a previous apparatus along the path and to transmit the received information to a subsequent apparatus along the path. The system has access to at least one predetermined transmission introduction sequence and also having access to a time-frequency format for use in assigning available transmission frequency bandwidth during a discrete transmission interval, said format defining a plurality of transmission windows within such an interval. Each window occupies a different part of that interval and having a frequency bandwidth profile within said available transmission frequency bandwidth over its part of that interval, each said window being assignable for such a transmission interval to at least one of said apparatuses for use in transmission. The method for use in this system includes, when transmitting a message with a preamble in a particular transmission interval, transmitting the preamble in a first transmission window of that transmission interval. The method further includes transmitting the transmission introduction sequence in a second transmission window of that transmission interval other than the first transmission window as control information for use by at least one said intermediate apparatus.

BRIEF DESCRIPTION OF THE DRAWINGS

For a more complete understanding of the present invention and its advantages, reference is now made to the following description, taken in conjunction with the accompanying drawings, in which:

FIG. 8 shows a single hop TDD frame structure used in the OFDMA physical layer mode of the IEEE 802.16 standard.

DETAILED DESCRIPTION

Figure 1:
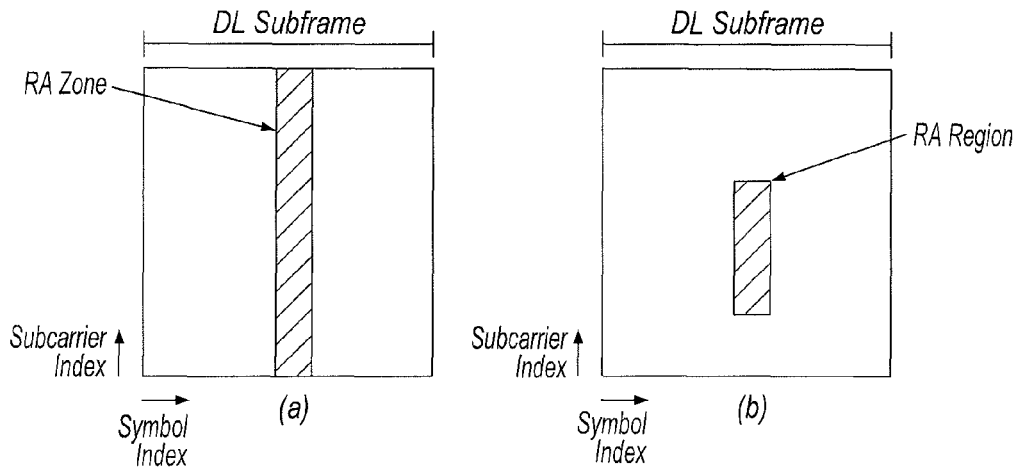
FIG. 1 shows RA zone and RA region definition.

The process of modulation, transmission, reception and demodulation of an information signal, as performed in a communication system, will cause typically the original signal to experience some distortion. These distortions may include delay, frequency offset and phase rotation and can result in the reception of multiple independently distorted replicas of the original signal. In order to correct for these distortions in the receiver, it is common for a communication system to make use of special training sequences, transmitting them through the channel so that they undergo the same distortion as the information signal. As these training sequences are known in the receiver, it is possible to estimate the distortion introduced by the transmission process and then correct the received information signal so that the distortion is minimized or completely removed. Thus such a training signal can be used in both the synchronization (time & frequency) and channel estimation and equalization stages of the receiver.

It is possible to form a set of a number of known training sequences for transmission within the communication system. Each sequence in the set is distinct from all other sequences such that it is possible at the receiver to distinguish the identity of a transmitter in a communication network where multiple transmitters exist. This allows the receiver to ascertain certain properties possessed by the transmitter as well as estimate the transmitter and channel induced distortion that will be experienced on a signal that is received from that particular transmitter.

In single hop communication systems (e.g. IEEE 802.16e-2005) one such transmission signal that can be used for the purposes of identification and training is the preamble sequence. As its name suggests, it is transmitted at the start of every frame prior to the transmission of data. A 802.16e-2005 single hop subscriber or mobile station (SS or MS) will utilize the preamble to perform a number of tasks, including transmitter identification to determine the IDCell parameter and segment number. It will also use it to synchronize (i.e. correct timing and frequency offsets) to the transmitter.

Thus to support legacy MS or SS, a relay station may be required to transmit a preamble to enable the MS or SS to identify, synchronize and communication with it. As all the preamble transmissions from all of the transmitters (BS & RS) should be time synchronized in a cellular style network, such a requirement precludes an active RS from being able to receive the preamble sequence from a BS or another RS due to the physical limitation that it cannot transmit and receive on the same transmission resource at the same time.

Particular embodiments involve devising a new signal for transmission by the BS or RS which can be received by the RS to enable it to both transmit a standard preamble sequence and receive the new signal to enable it to perform transmitter identification, synchronization and channel estimation.

As an example, FIG. 8 illustrates the single hop TDD frame structure used in the OFDMA physical layer mode of the IEEE 802.16 standard indicating the location of the standard mandatory preamble sequence that can be used by an MS for BS identification and training of the distortion correcting elements of the receiver.

Particular embodiments introduce a new signal that is transmitted in another region of the DL sub-frame (other than the region where the preamble is located). This signal could be in the middle of the DL sub-frame, thus forming a mid-amble or at the end of the sub-frame, thus forming a post-amble. From here on, for the sake of generality, the new signal is referred to as the relay-amble (RA).

RA Signal Design

The requirements for the RA, similar to those of the preamble, are that it can be used by the receiver to identify and distinguish the transmitter from potentially a number of other transmitters in the communication network. It must also enable the receiver to estimate, or update an existing estimate, of the transmitter and channel induced distortion. It must not be accidentally identified by an MS as a normal preamble sequence, as this may confuse a legacy MS that is not aware of the existence of relay-ambles.

In order to meet these requirements, it is possible to envisage that a number of different well-known mathematical sequences could be used to generate the relay-amble or set of relay-ambles used in a communication network.

In general, the properties of the transmitted RA signal may therefore be:

Good auto-correlation properties: To enable the determination of time/frequency offsets induce in the transmission process;

Possible to form a set of unique sequences: To enable different sequences to be used to identify different transmitters (i.e. provide an identification parameter that can be further used in the receiver);

Good cross-correlation properties: To prevent false detection of time/frequency offsets;

Low peak to average power ratio (PAPR) in the time domain: Enables the use of non-linear amplifiers or transmit power boosting above the standard data transmission power due to the different in PAPR between the RA and the data signal;

Near-constant or constant amplitude in the frequency domain: Provides uniform sounding of the transmission channel and thus improves the accuracy that can be achieved by the channel estimator in the receiver;

Low correlation with all of the normal preamble sequences: Prevents false detection of the RA as a normal preamble by a legacy MS.

Based on these requirements it could be possible to use either: PN (pseudo-noise) sequences as used in the IEEE 802.16 standard; Golay sequences [4] [5]; or CAZAC sequences (Constant Amplitude & Zero Auto Correlation) (see [3] for more information on use of CAZAC sequences for training) such as Chu [2] and Frank-Zadoff [1] sequences to construct the relay-amble. All of these sequences are known to exhibit some or all of the required properties and hence have been previously proposed for use in forming such training or identification sequences.

However, depending on the sequence types used for the normal preamble and the ability to provide a set of sequences with the properties listed above, it might not be possible to consider use of any of the sequence types. For example, if PN sequences are used for the normal preamble, then it could be found that it is not possible to generate a sufficient number of further PN sequences with the properties listed (for example low PAPR) for the relay-amble set. In which case, it would be more appropriate to use a set of sequences of a different type, ensuring that the selected set of relay-ambles maintain the required properties of low correlation with all the normal preamble sequences.

Transmission Process of RA at the BS or RS

The BS or RS that is transmitting an RA will first decide on the location of the RA transmission within the downlink sub-frame. As mentioned earlier, the transmission could be located anywhere within the frame. However, it is possible to envisage that certain formal frame structures may be required to support relaying that limit the flexibility afforded to the transmitter in placement of the RA.

Once the location of the RA within the frame is determined, the transmitter then determines the amount of transmission resource that will be allocated to the RA. Various factors will have an effect on this decision including: the effective frequency reuse to be achieved at a multi-sector transmitter; the requirement to reduce interference; the amount of transmission resource that will be utilized by the BS to RS or RS to RS data transmission; the method used for separating different transmitters operating on the same frequency in a cellular network; and also the type of sequence used to form the RA.

One solution is to form an RA zone in the downlink sub-frame, as shown in FIG. 1(a). Here a whole OFDM symbol is reserved for RA transmission. An alternative approach is to allocate a sub-band or region of the downlink sub-frame to the RA transmission, as shown in FIG. 1(b).

The former is appropriate if the whole band is available for BS to RS or RS to RS data transmission, whilst the latter could be adopted to minimize the amount of transmission resource required if a full symbol is not required as could be the case if the set of RAs is small or the BS to RS or RS to RS data transmission is only utilizing a part of the total frequency transmission resource (i.e. a sub-band).

Figure 2:
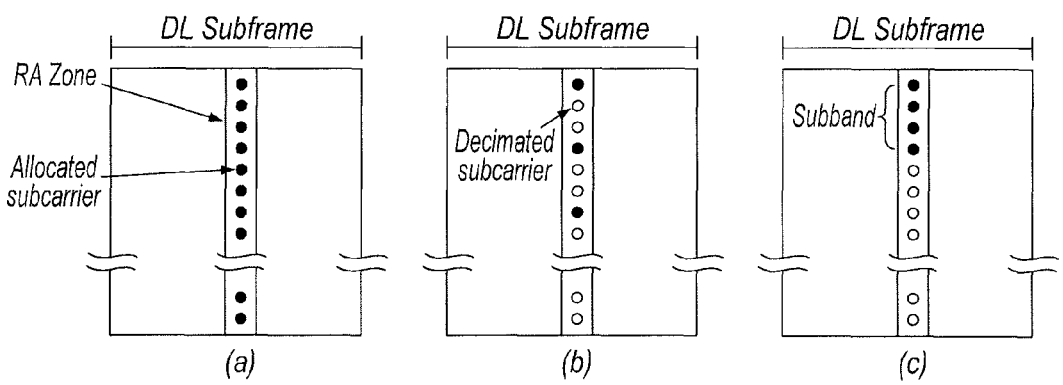
FIG. 2 shows Usage of transmission resource in an RA zone.

Once a zone or region is defined within the transmitter, the transmitter then determines the usage of the transmission resource within the zone or region. Numerous usage scenarios can be envisaged, including: all tones are allocated for RA transmission; the total number of tones are decimated so that the RA is allocated to every second, third, fourth, etc, tone; a contiguous sub-band of tones is allocated. Each of these mechanisms is illustrated in FIG. 2 for the case of an RA zone. It is also possible to extend the proposed methods to the case of an RA region.

The benefit of the first approach is that it enables accurate channel estimation as each tone is illuminated with a known transmission enabling distortion to be determined on each individual subcarrier. The benefit of the second approach is that in a frequency reuse 1 scenario, by decimating the tones and using different offsets of decimated sequences at different transmitters it is possible to achieve an effective frequency reuse of greater than 1. An example could be a three sector site, where a decimation factor of three is employed at each sector using an incrementing offset of the starting subcarrier number on each sector (i.e. sector 1 uses subcarriers $\{0, 3, 6, \text{etc}\}$, sector 2 uses $\{1, 4, 7, \text{etc}\}$ and sector 3 uses $\{2, 5, 8, \text{etc}\}$. The benefit of the third approach is that similar to the case above, it is possible to achieve an effective frequency reuse of greater than 1 by assigning different sub-bands to different sectors.

Now that the number and location of the available tones for the transmitter is decided, the final stage is to generate the training and identification sequence to be transmitted on the identified tones. As discussed previously, it is possible to make use of a number of different well known sequences for this purpose.

It is worth noting that in a synchronous cellular network, it is likely that the zone or region allocation will be performed in some network management entity (this could be located within the core network or within one of the transmitters). Also the same situation may exist for the case of allocation of a particular sequence to a transmitter, especially if the sequence is conveying inherent identification parameters. This network management entity will then ensure that the location of the zone or region across all transmitters in the cellular network is harmonized. This then prevents interference between RA transmissions from one transmitter and data transmissions from another, which could be significant especially if the RA transmission power is boosted due to its lower PAPR properties. It will also ensure that the allocation of identification parameters ensures that from a receiver point of view, it will never experience receiving the same identification from two visible transmitters (i.e. there is sufficient spatial separation between the reuse of the same identification sequence).

Finally, the transmitter (RS/BS) may include some signaling information in the broadcast message to indicate the existence and location of the RA zone or region to the RS, alternatively it may also include signaling information in a multicast or unicast message specifically directed towards the RS to inform it of the RA existence.

Figure 3:
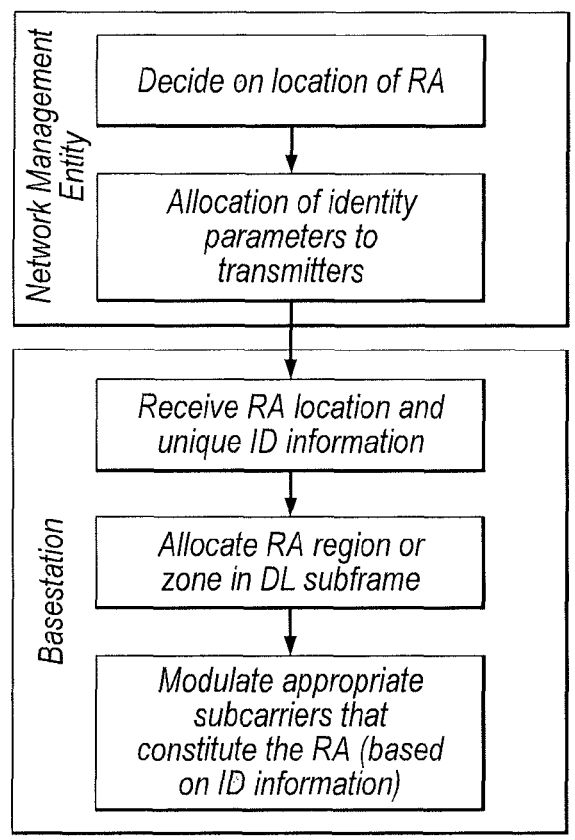
FIG. 3 shows Interaction between the transmitters and the network management entity.
Figure 5:
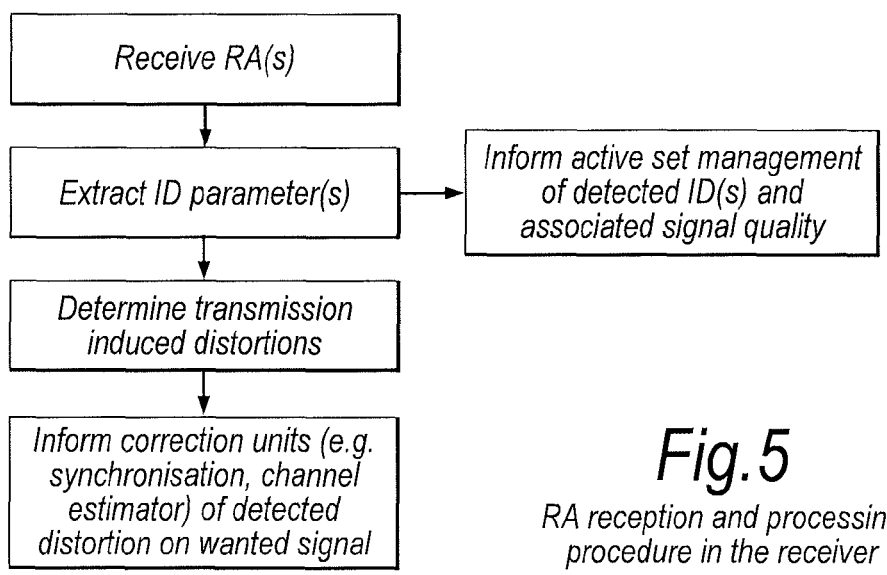
FIG. 5 shows RA reception and processing procedure in the receiver.
Figure 4:
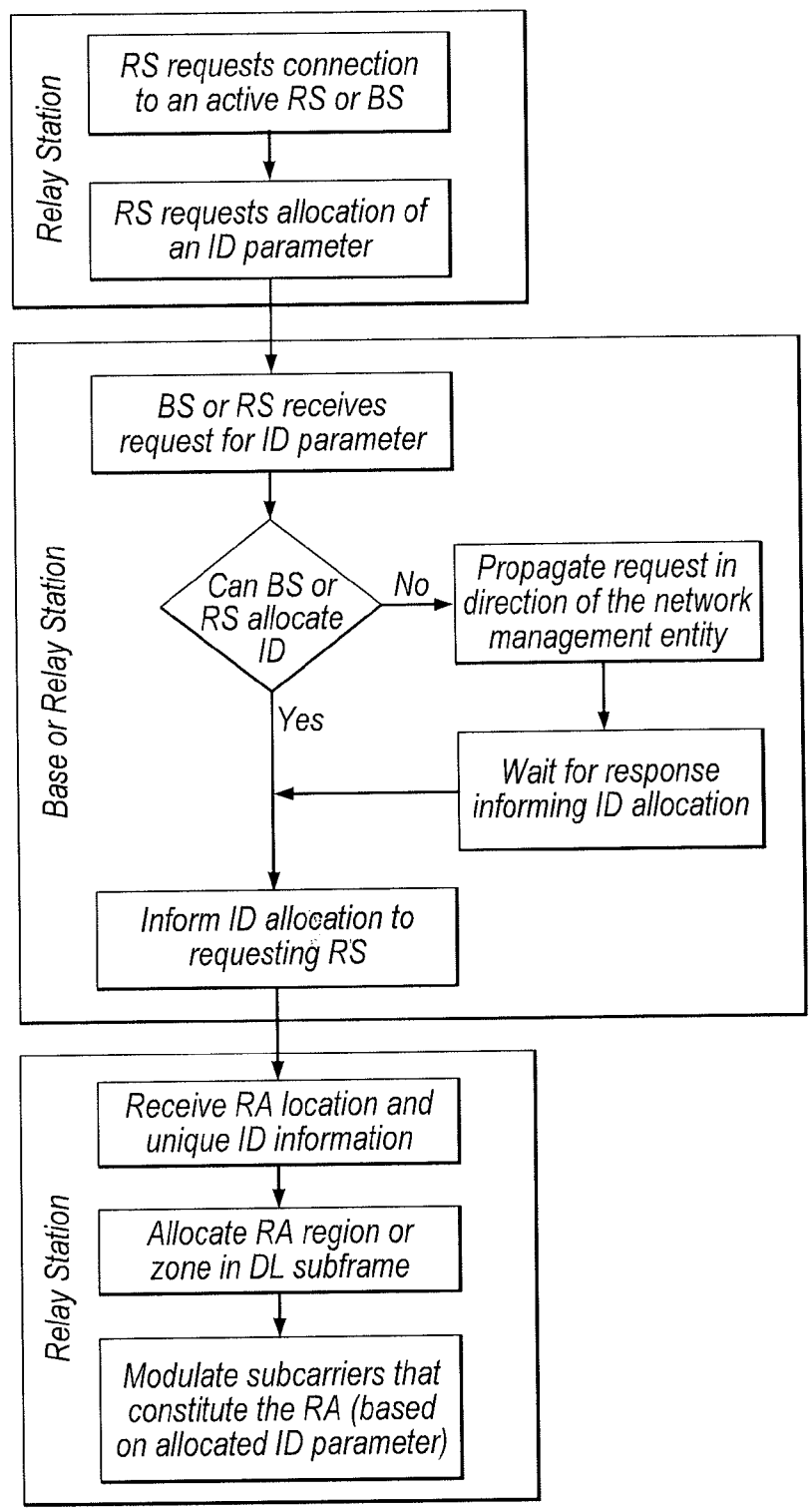
FIG. 4 shows Interaction between a network associating RS and the already operational network.
Figure 6:
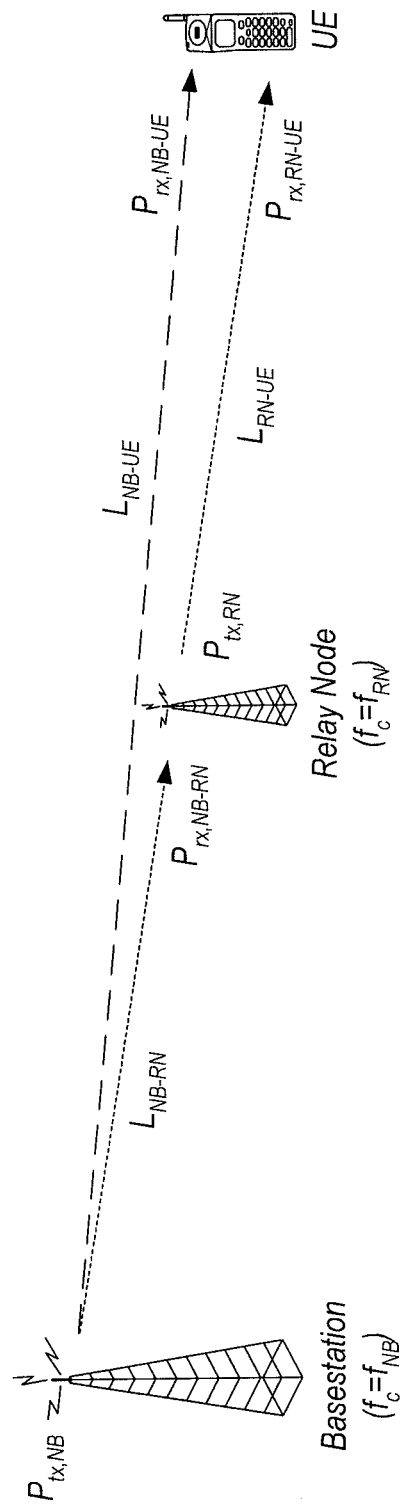
FIG. 6 shows a single-cell two-hop wireless communication system.
Figure 7A:
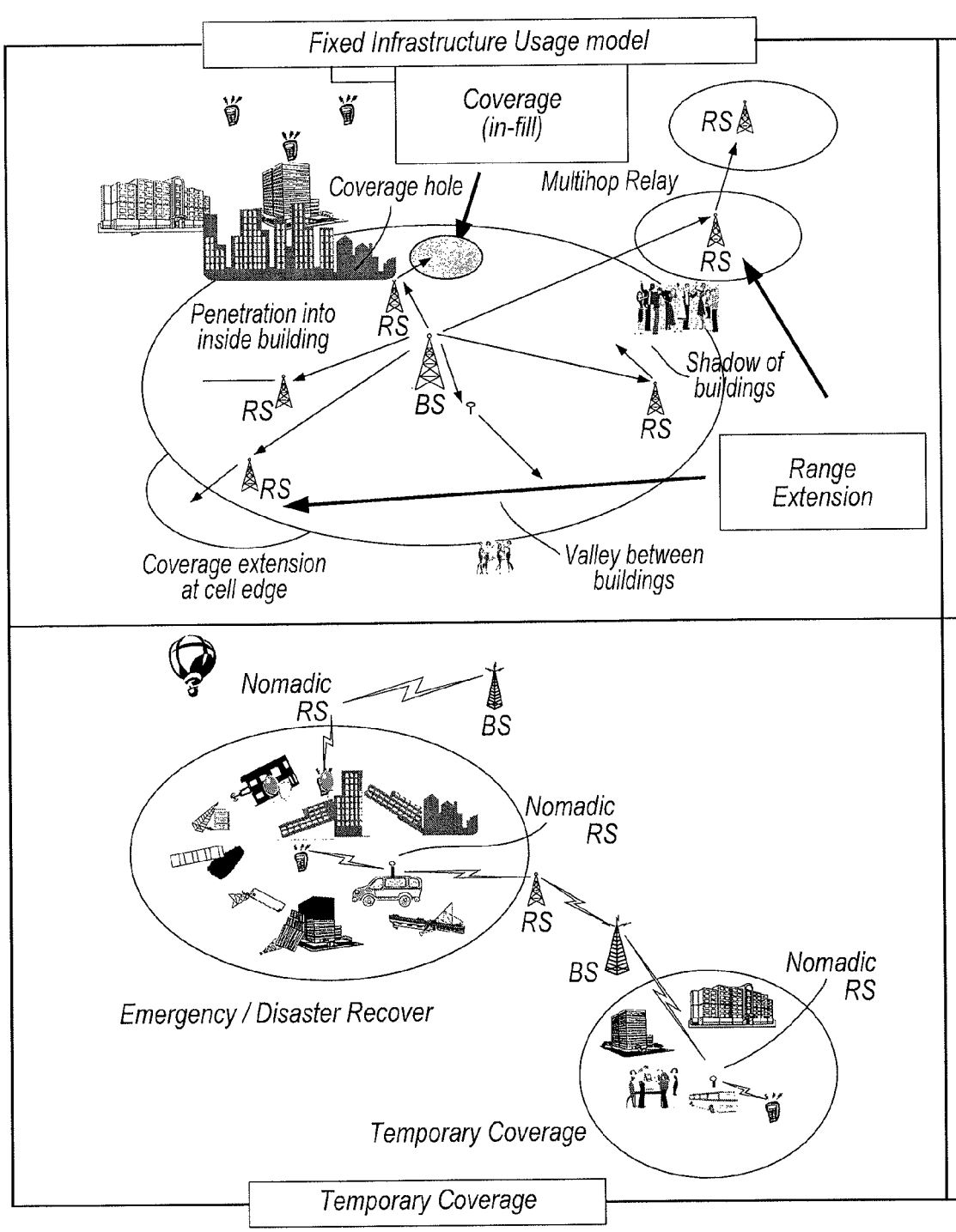
FIG. 7 shows applications of relay stations.
Figure 7B:
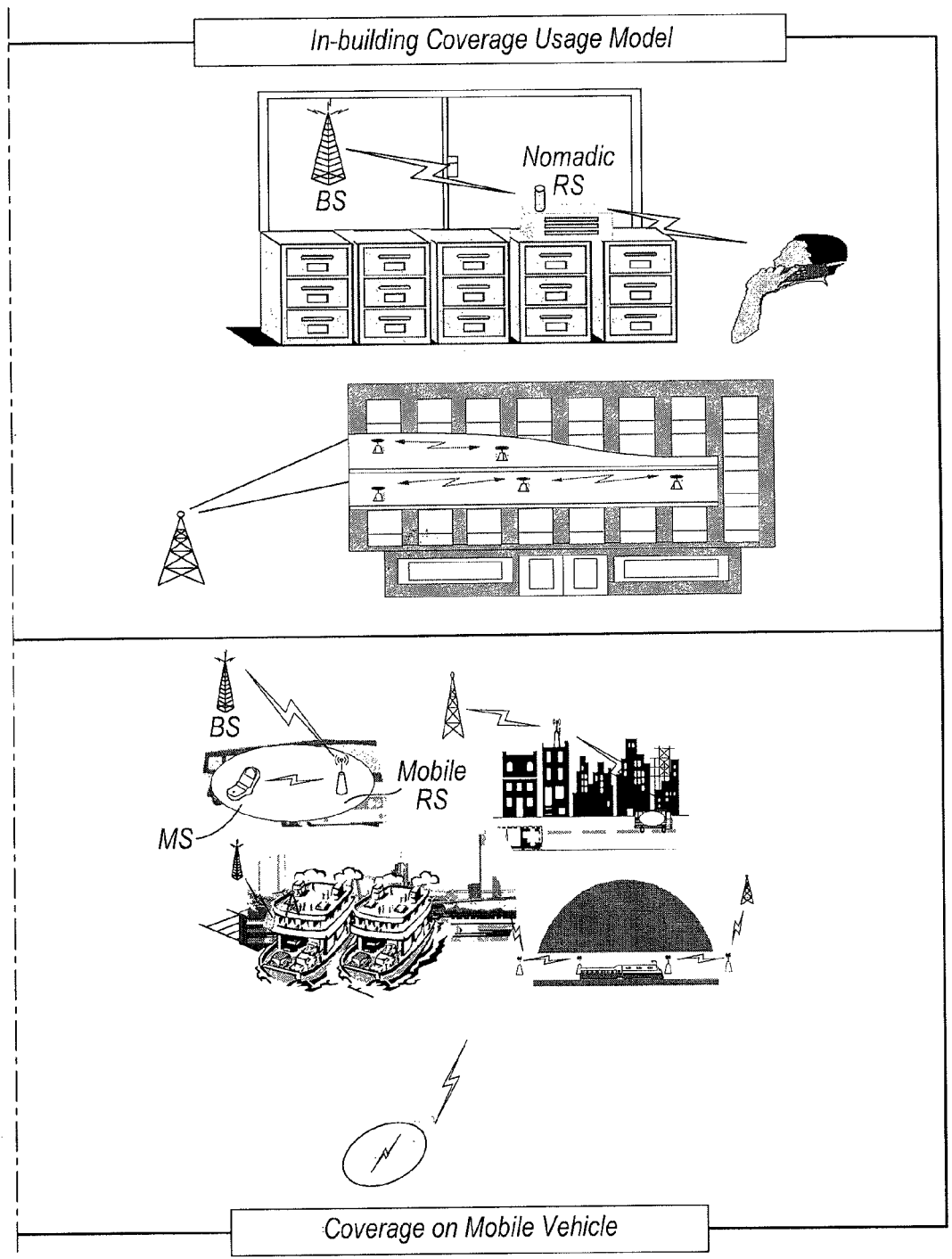

In summary, FIG. 3 provides a flowchart that describes the interaction between the network management entity and the base stations which are to transmit an RA. FIG. 4 provides a flowchart that describes the interaction between an RS that has entered into an already operational network and the BS or RS to which it is attempting to associate. Finally, FIG. 5 outlines the RA reception and processing procedure in the receiver.

In summary, the benefits of particular embodiments may include:

Enabling an RS to maintain synchronization (time & frequency) with a BS or another RS in the case that it cannot receive the identification and training information generated for use by the MS.

Enabling an RS to use the sequence to update its estimate of the channel state information.

Preventing the operation of a legacy MS (that is not being designed to operate in a relay system) from being disturbed by the transmission of a further training and identification signal.

Enabling an RS to scan and monitor the quality of the received signal from other neighboring BSs or RSs to which it could potential associate with.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

REFERENCES

[1] Frank R L, Zadoff S A. Phase shift codes with good periodic correlation properties. *IEEE Transactions on Information Theory* pp. 381-2; October 1962.
[2] Chu D C. Polyphase codes with good periodic correlation properties. *IEEE Transactions on Information Theory* pp. 531-2; July 1972
[3] Milewski A. Periodic sequences with optimal properties for channel estimation and fast start-up equalization. *IBM Research and Development Journal* pp. 426-31; September 1983.
[4] M. J. E. Golay, "Multislit spectroscopy," *J. Opt. Soc. Amer.*, 39, pp. 437-444, 1949.
[5] M. J. E. Golay, "Complementary series," *IRE Trans. Inform. Theory*, IT-7, pp. 82-87, April 1961.

What is claimed is:

1. A base station comprising:
a processor; and
a transmitter;
the processor arranged to configure the transmitter to transmit a known preamble to a subscriber station or a mobile station in a down-link subframe at the same time that another known preamble is transmitted by relay station to another subscriber station or another mobile station and to transmit a relay amble to the relay station in a downlink subframe, wherein a transmission timing of the preambles and a transmission timing of the relay amble are not the same, and wherein the relay amble is transmitted at an end of the downlink subframe.

2. The base station according to claim 1, wherein the preambles are transmitted at a beginning of the downlink subframe.

3. The base station according to claim 1, wherein the preamble and the relay amble have different sequences.

4. The base station according to claim 1, wherein the relay amble is received by the relay station for synchronization or channel estimation.

5. A relay station comprising:
a transmitter configured to transmit a known preamble to a subscriber station or a mobile station in a downlink subframe at the same time that another known preamble is transmitted by a base station;
a receiving unit configured to receive a relay amble transmitted from the base station in a downlink subframe; and
a synchronizing unit configured to synchronize with the received relay amble, wherein the relay amble is transmitted at an end of the downlink subframe.

6. The relay station according to claim 5, wherein the relay amble has a certain sequence which is different from a sequence of the known preamble transmitted from the base station.

7. A method of transmission in a base station comprising:
the base station transmitting a known preamble to a subscriber station or a mobile station in a down-link subframe at the same time that another known preamble is transmitted from a relay station to another subscriber station or another mobile station; and
the base station transmitting a relay amble to the relay station in a downlink subframe, wherein a transmission timing of the preamble and a transmission timing of the relay amble are not the same, and wherein the relay amble is transmitted at an end of the downlink subframe.

8. The method according to claim 7, further comprising transmitting the preambles at a beginning of the downlink subframe.

9. The method according to claim 7, wherein the preambles and the relay amble have different sequences.

10. The method according to claim 7, wherein the relay amble is received by the relay station for synchronization or channel estimation.

11. A method in a relay station comprising:
transmitting a known preamble to a subscriber station or a mobile station in a downlink subframe at the same time that another known preamble is transmitted from a base station to another subscriber station or another mobile station;
receiving a relay amble transmitted from the base station in a downlink subframe; and
synchronizing with the received relay amble, wherein the relay amble is transmitted at an end of the downlink subframe.

12. The method according to claim 11, wherein the relay amble has a certain sequence which is different from a sequence of the known preamble transmitted from the base station.

* * * * *